(12) United States Patent
Cross et al.

(10) Patent No.: US 9,769,974 B2
(45) Date of Patent: Sep. 26, 2017

(54) COMBINATION C-SHAPED SPRING AND SYSTEM

(71) Applicant: Deere & Company, Moline, IL (US)

(72) Inventors: Jacob W. Cross, Ankeny, IA (US); Luc Janelle, Ankeny, IA (US); Adam D. Sporrer, Ames, IA (US); Anthony Sikora, Urbandale, IA (US); Mark D. Beeck, Ankeny, IA (US); Richard J. Connell, Slater, IA (US); Robert T. Casper, Mingo, IA (US); John M. Schweitzer, Ankeny, IA (US); Dolly Y. Wu, Silvis, IL (US)

(73) Assignee: DEERE & COMPANY, Moline, IL (US)

( * ) Notice: Subject to any disclaimer, the term of this patent is extended or adjusted under 35 U.S.C. 154(b) by 319 days.

(21) Appl. No.: 14/546,344

(22) Filed: Nov. 18, 2014

(65) Prior Publication Data
US 2015/0366125 A1  Dec. 24, 2015

Related U.S. Application Data

(60) Provisional application No. 62/016,360, filed on Jun. 24, 2014.

(51) Int. Cl.
*A01B 61/04* (2006.01)
*F16F 3/02* (2006.01)
(Continued)

(52) U.S. Cl.
CPC ............ *A01B 61/046* (2013.01); *F16F 1/187* (2013.01); *F16F 3/023* (2013.01); *A01B 76/00* (2013.01); *F16F 2230/007* (2013.01)

(58) Field of Classification Search
CPC ..... A01B 61/046; A01B 61/04; A01B 61/044; A01B 33/025; A01B 31/08; A01B 21/083;
(Continued)

(56) References Cited

U.S. PATENT DOCUMENTS

| 1,173,850 | A | * | 2/1916 | Oliver | F16F 1/26 248/627 |
| 2,278,244 | A | * | 3/1942 | Smithwick | B62B 5/082 267/160 |

(Continued)

FOREIGN PATENT DOCUMENTS

DE  WO 9319650 A1 * 10/1993 ............ A47C 3/023

OTHER PUBLICATIONS

Collins, L. M.; Torrione, P. A.; Munshi, V. S.; Throckmorton, C. S.; Zhu, Q.; Clodfelter, J. F., and Frasier, S. "Algorithms for landmine detection using the NIITEK ground penetrating radar." Proc. SPIE, Aug. 2002, vol. 4742, pp. 709 (online abstract) (retrieved on Oct. 21, 2014). Retrieved from the Internet<http://proceedings.spiedigitallibrary.org/proceeding.aspx?articleid=888426>.
(Continued)

*Primary Examiner* — Matthew D Troutman

(57) ABSTRACT

A C-spring contains an inner spring that is spaced apart from the outer primary spring. In one example usage, the upper and lower legs of the C-spring have rear regions respectively configured for being mounted to a tubular frame tool frame member of a ground working implement, such as a disk, and to a bearing housing.

21 Claims, 17 Drawing Sheets

(51) Int. Cl.
*F16F 1/18* (2006.01)
*A01B 76/00* (2006.01)

(58) Field of Classification Search
CPC .......... A01B 76/00; A01B 61/00; F16F 3/023;
F16F 2234/00; F16F 2238/022; F16F
1/187; F16F 15/1211; F16F 15/1331;
Y10T 403/32549; Y10T 403/32557;
B60G 11/00; B60G 11/006; B60G 11/04;
A63B 23/16; A63B 23/0482–23/0488
USPC ....... 297/285, 286, 289, 290, 294, 295, 296,
297/297, 268.1; 482/49; 267/158–160;
248/628
See application file for complete search history.

(56) References Cited

U.S. PATENT DOCUMENTS

| | | | | |
|---|---|---|---|---|
| 2,750,861 | A * | 6/1956 | Erwin | A01B 15/16 111/926 |
| 3,740,792 | A * | 6/1973 | Werner | A47C 3/026 16/298 |
| 4,066,132 | A * | 1/1978 | Rehn | A01B 61/04 172/572 |
| 4,333,535 | A | 6/1982 | Hentrich, Sr. | |
| 4,407,372 | A | 10/1983 | Rozeboom | |
| 4,724,910 | A | 2/1988 | Wheeler | |
| 4,889,385 | A * | 12/1989 | Chadwick | A47C 3/026 297/285 |
| 7,511,654 | B1 | 3/2009 | Goldman et al. | |
| 7,721,815 | B2 | 5/2010 | Hoffman et al. | |
| 8,413,739 | B2 | 4/2013 | Casper et al. | |
| 8,534,374 | B2 * | 9/2013 | Hake | A01B 21/08 172/599 |
| 2002/0005658 | A1 * | 1/2002 | Piretti | A47C 7/402 297/302.3 |
| 2015/0053438 | A1 * | 2/2015 | Kovach | A01B 61/046 172/264 |

OTHER PUBLICATIONS

Pristov, E.; Dalton, W.; and Likins, G. "Measurement of concrete thickness and detection of defects using ultrasound methods." Proceedings of the fifth highway geophysics—NDE conference: Charlotte, NC, 2008, pp. 295-301 (online) (retrieved on Oct. 21, 2014). Retrieved from the Internet <http://www.inspectioninstruments.net/reference/5highwayndeconference/measurementofconcretethickness.pdf>.

Valerio, G.; Galli, A.; Barone, P. M.; Lauro, S. E.; Mattei, E.; and Pettinelli, E. "GPR investigation on buried rocks in martian subsoil for 'Wisdom' project: numerical and measurement set-up results." Antennas and (EuCAP), 2010 Proceedings of the Fourth European Conference, Institute of Electrical and Electronics Engineers (online) (retrieved on Oct. 23, 2014). Retrieved from IEEE Xplore Digital Library, Accession No. 11414815.

\* cited by examiner ously. The mechanical shock absorbing device is designed
COMBINATION C-SHAPED SPRING AND SYSTEM

RELATED APPLICATIONS

This patent application claims priority to U.S. Provisional Patent Application Ser. No. 62/016,360, filed Jun. 24, 2014, and titled, DISK GANG C-SHAPED STANDARD COMBINED WITH AN OVERLOAD SPRING, the contents of which are incorporated herein by reference.

FIELD

The present embodiments relate generally to springs such as those used for suspending tools from an implement frame.

BACKGROUND

Springs may serve as shock absorbers located between two objects to damp out the collision forces between the two objects. The mechanical shock absorbing device is designed to smooth out or damp a shock impulse and convert the kinetic energy to another form of energy such as thermal energy, which dissipates in the atmosphere and in the material of the shock absorber and the colliding objects. When the forces between the two objects become very large, it is difficult to design shock absorbing springs that can sustain the force, and not lose their resilience. In an agricultural setting, springs damp and absorb the forces of very heavy (e.g. several tons) equipment traveling over rough soil and ground. For example, disks are ganged together in an arrangement that includes springs to resiliently suspend the disks on the implement frame. When the disk gang is operating in rocky or other unfavorable conditions, traditional springs may not have adequate shock absorption so that damage results to the springs, disks or other gang components.

SUMMARY

In one embodiment, there is provided a C-spring in combination with an overload or secondary spring designed and located so as to absorb shock and dissipate stored energy in the C-spring resulting from the C-spring being deflected beyond a normal range of operation. Another embodiment provides a C-spring that deflects when it moves beyond a normal distance of operation by an overload. Yet another embodiment provides a double C-spring. Example sensors are used to detect faults. This and other embodiments will become apparent from a reading of the ensuing description together with the appended drawings and claims.

DETAILED DESCRIPTION

Embodiments of combination springs are disclosed, springs that are found to be superior than past designs at least in spring rate adaptation under a high force impact. The large forces can range from 2000 to over 6000 pounds. The combination springs include an outer main C-shaped spring (or C-spring as an abbreviation), together with a secondary inner overload spring that has a different spring rate, resilience and other properties (e.g. fatigue or creep) than that of the main C-spring. The secondary inner spring acts as a force overload device to absorb large forces impacting the main C-spring. The secondary inner overload spring stops or cushions to prevent the legs of the main C-spring from compressing together beyond a threshold distance. The secondary inner spring either suddenly or more gradually alters the overall spring rate of the combined main C-spring. The legs of the secondary inner spring are both coupled to respective legs of the main C-spring. Alternatively, only one leg of the secondary inner spring is coupled to a leg of the main C-spring. The cushioned C-spring may be used in various situations. For example, the cushioned C-spring is discussed in an agricultural application where the terminology "standard" is sometimes used to refer to the spring element. The C-spring may be used as part of a disk bearing standard where a bearing housing and spool hang underneath the standard so that soil-cutting disks may be mounted to the spool or an axle of the spool. One of the purposes of including inner springs is so that the main C-spring is less likely to be damaged. However, disk bearing standards sometimes face very harsh conditions. A sensor system is described to monitor normal operation and detect damaged combination and C-springs. Additionally, when very large obstacles are detected, the vehicle pulling the springs and disks slow down, stops or the operator is alerted.

Figure 5:
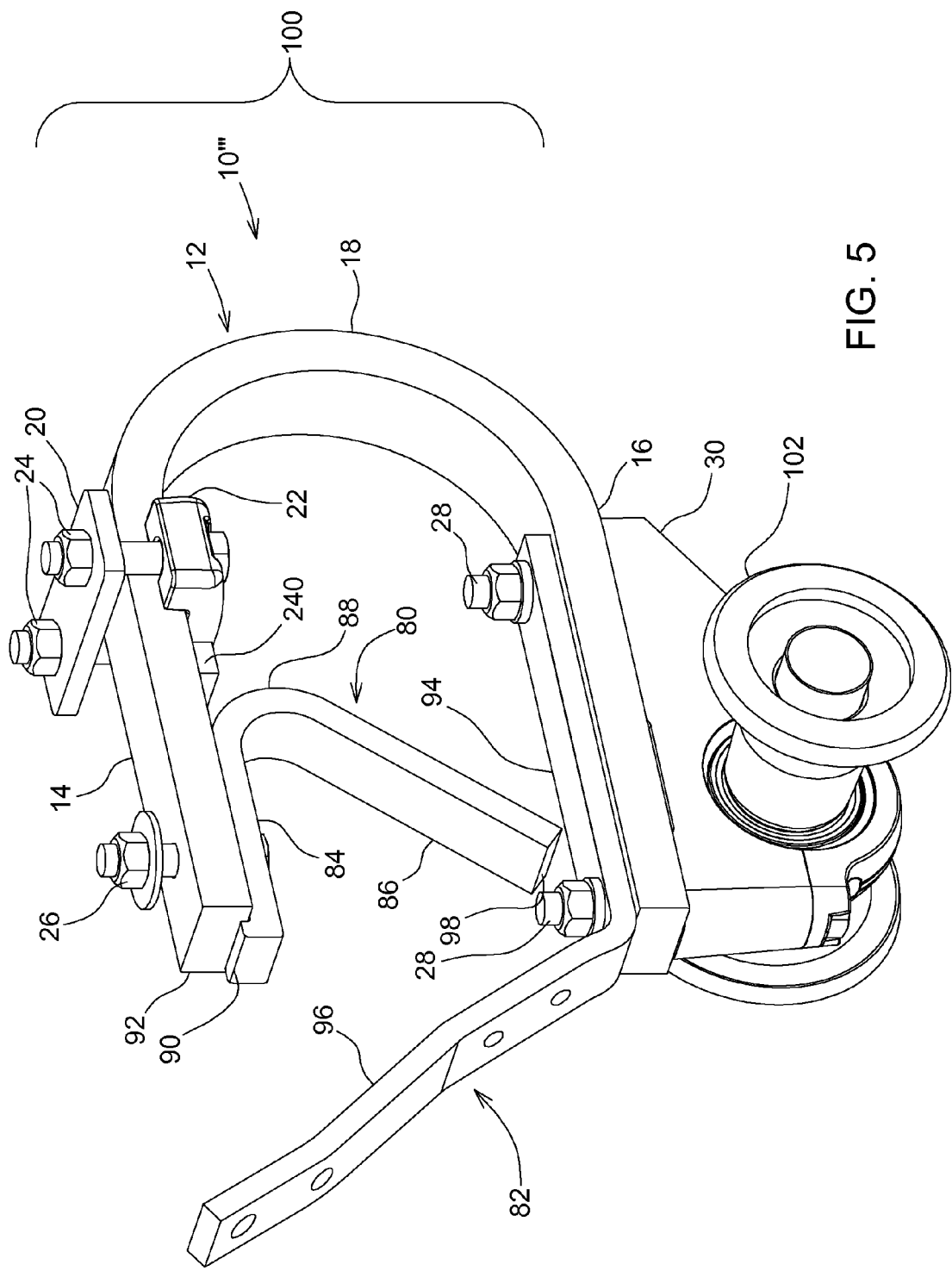
FIG. 5 depicts another example embodiment of a C-shaped spring with an overload spring.
Figure 6:
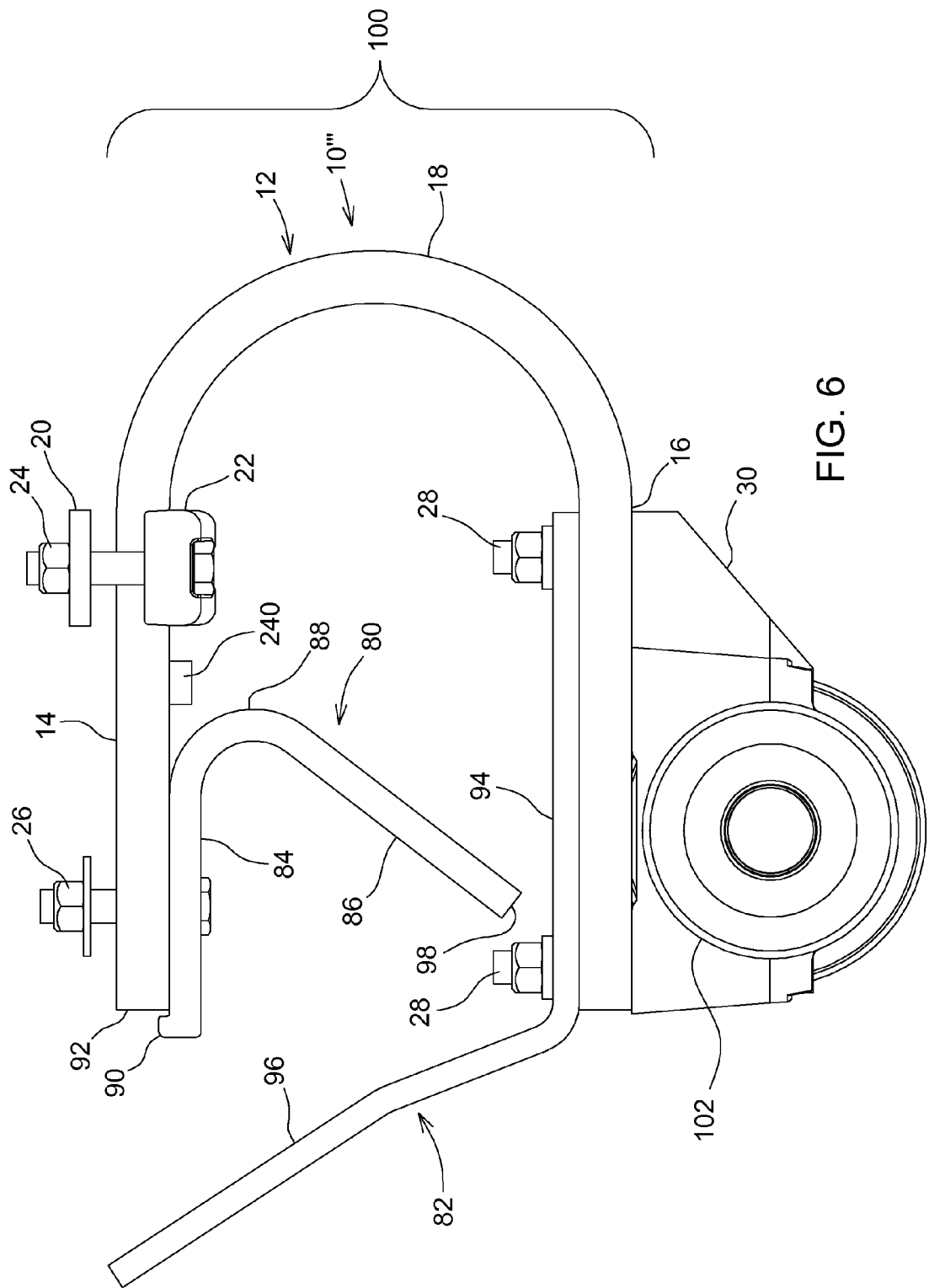
FIG. 6 depicts a right side view of the C-shaped spring and overload spring shown in FIG. 5.
Figure 7:
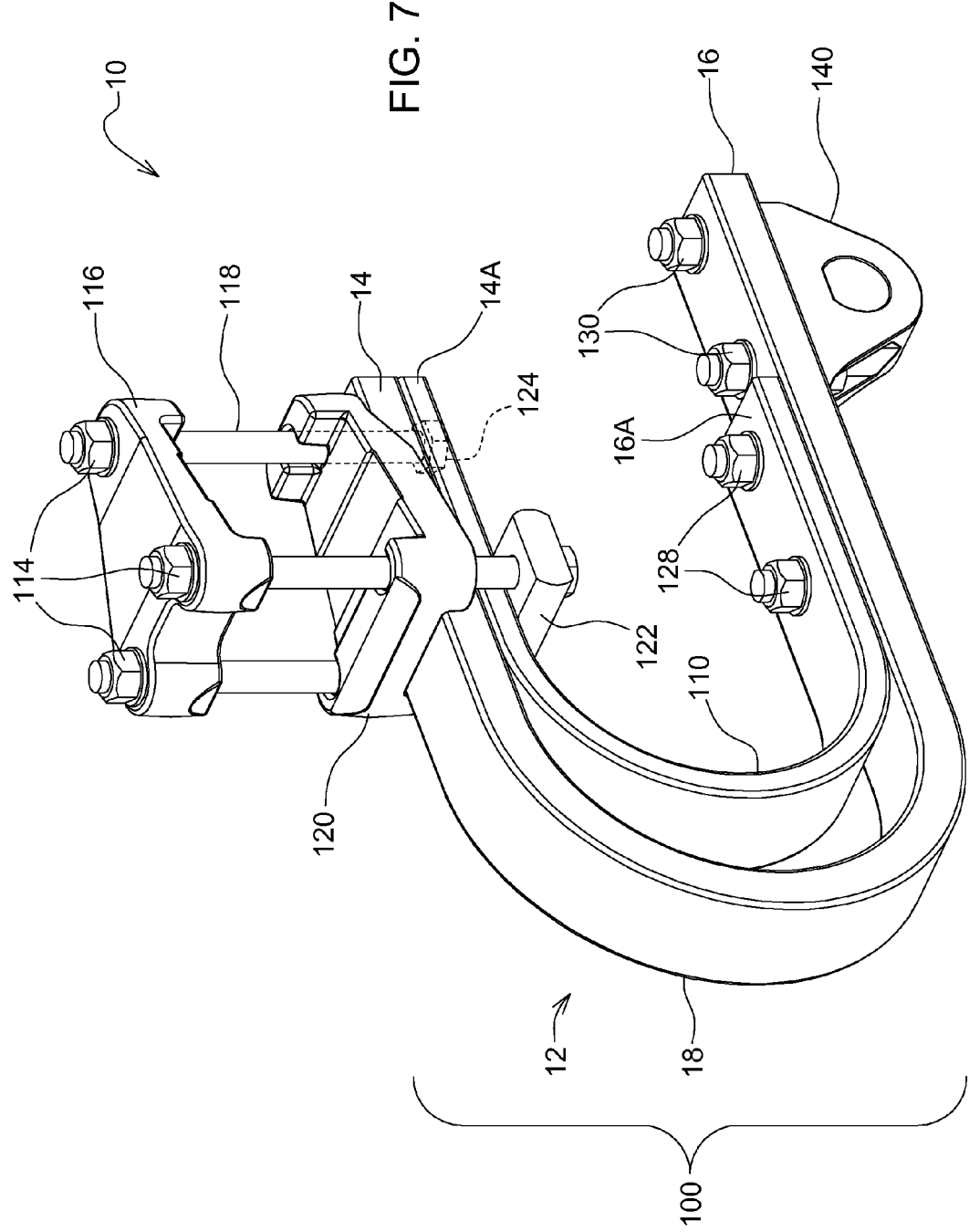
FIG. 7 depicts another example embodiment of a C-shaped spring with an overload spring.
Figure 8:
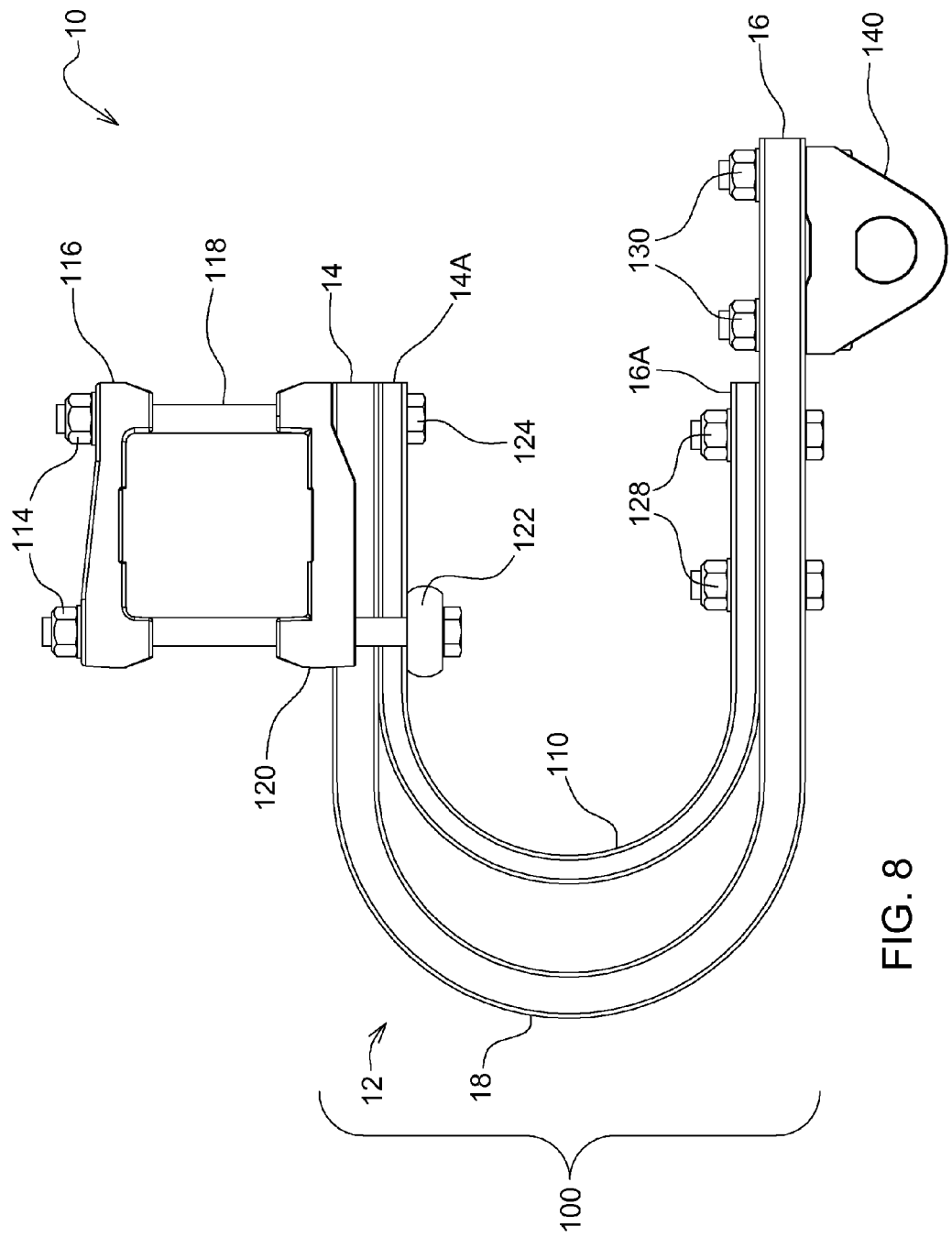
FIG. 8 depicts another perspective view of the device shown in FIG. 7.
Figure 9:
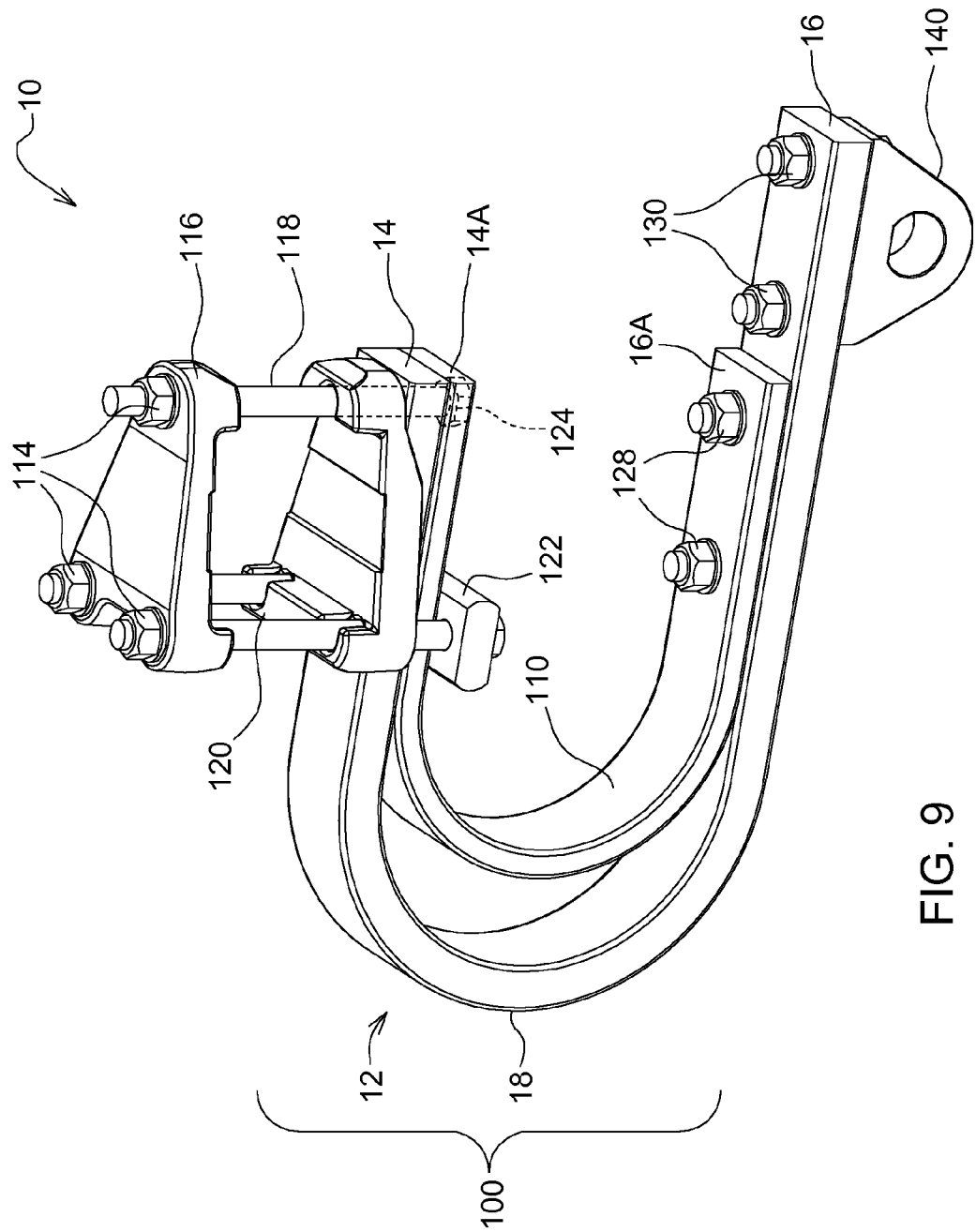
FIG. 9 depicts another perspective view of the device shown in FIG. 7.

FIGS. 1-10 depict example main C-springs 12 combined with various embodiments of an inner spring (e.g. 36, 50, 64, 80, 110). The combination spring 100 is further depicted as part of an agricultural disk bearing standard, although the combination spring 100 may also be used in other settings without being attached to a bearing and disk. For instance, FIGS. 7-9 depict the combination spring 100 without a bearing.

Figure 1:
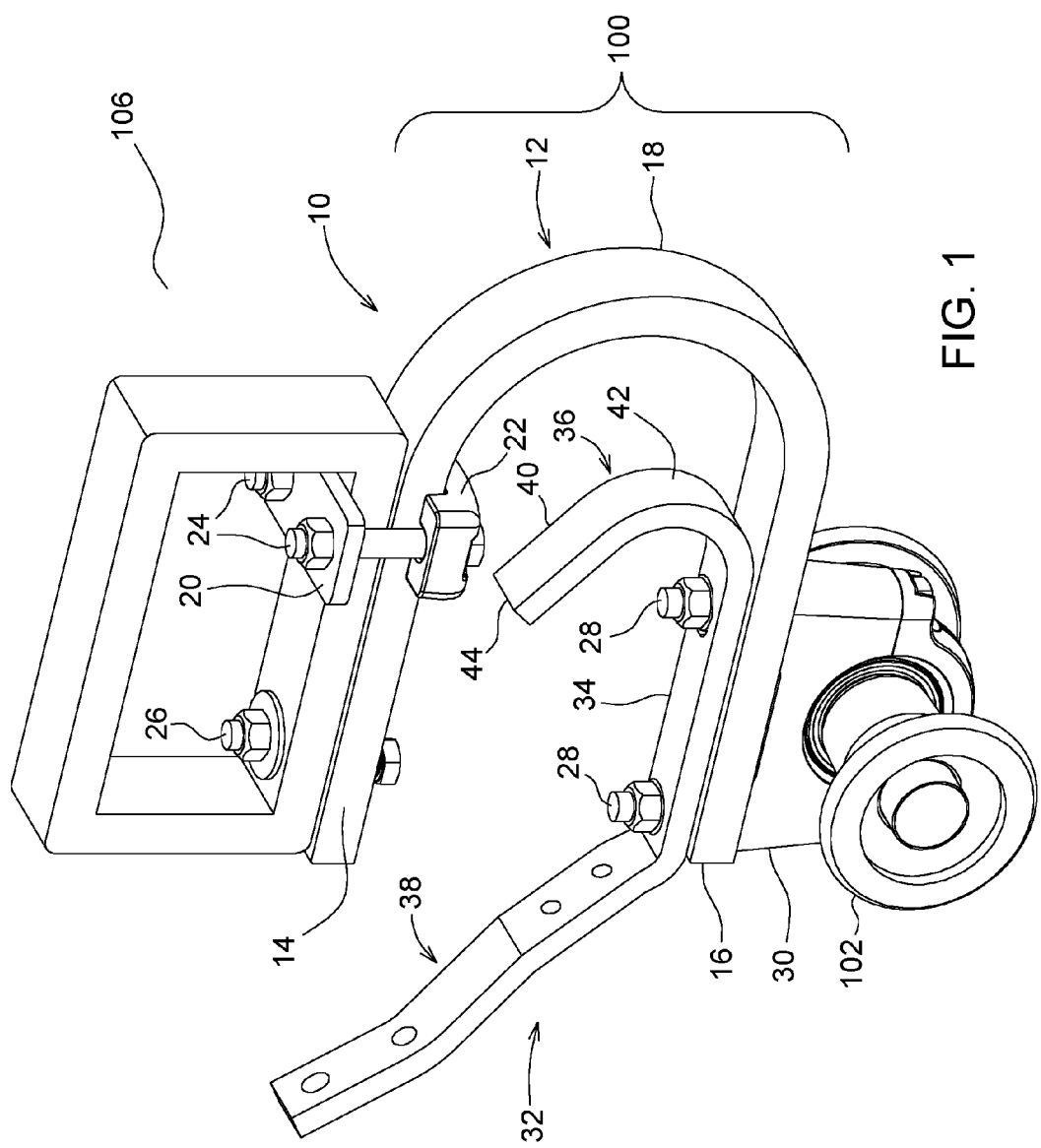
FIG. 1 depicts an example C-shaped spring with an overload spring.
Figure 2:
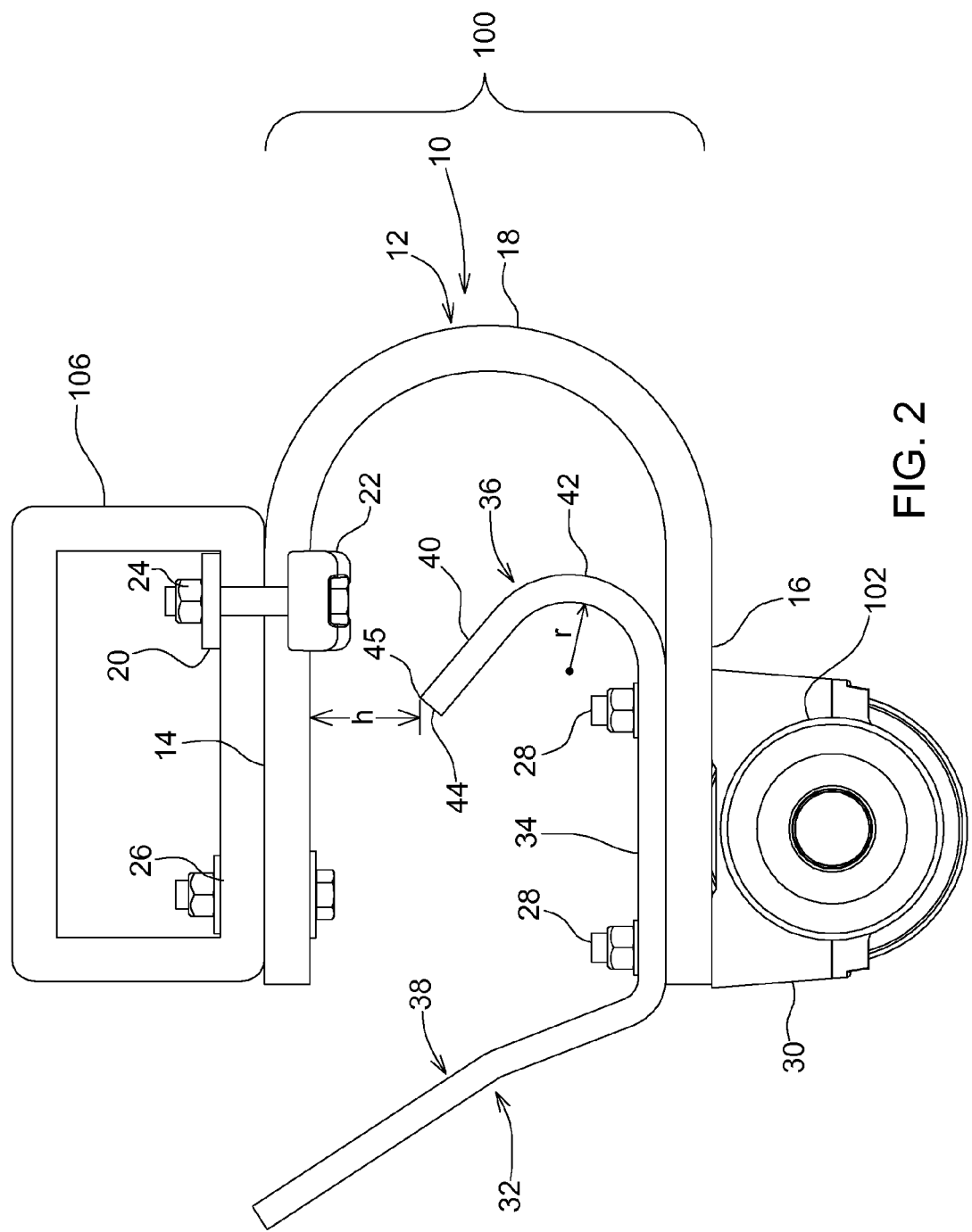
FIG. 2 depicts a right side view of the combined C-shaped spring and overload spring shown in FIG. 1.
Figure 11:
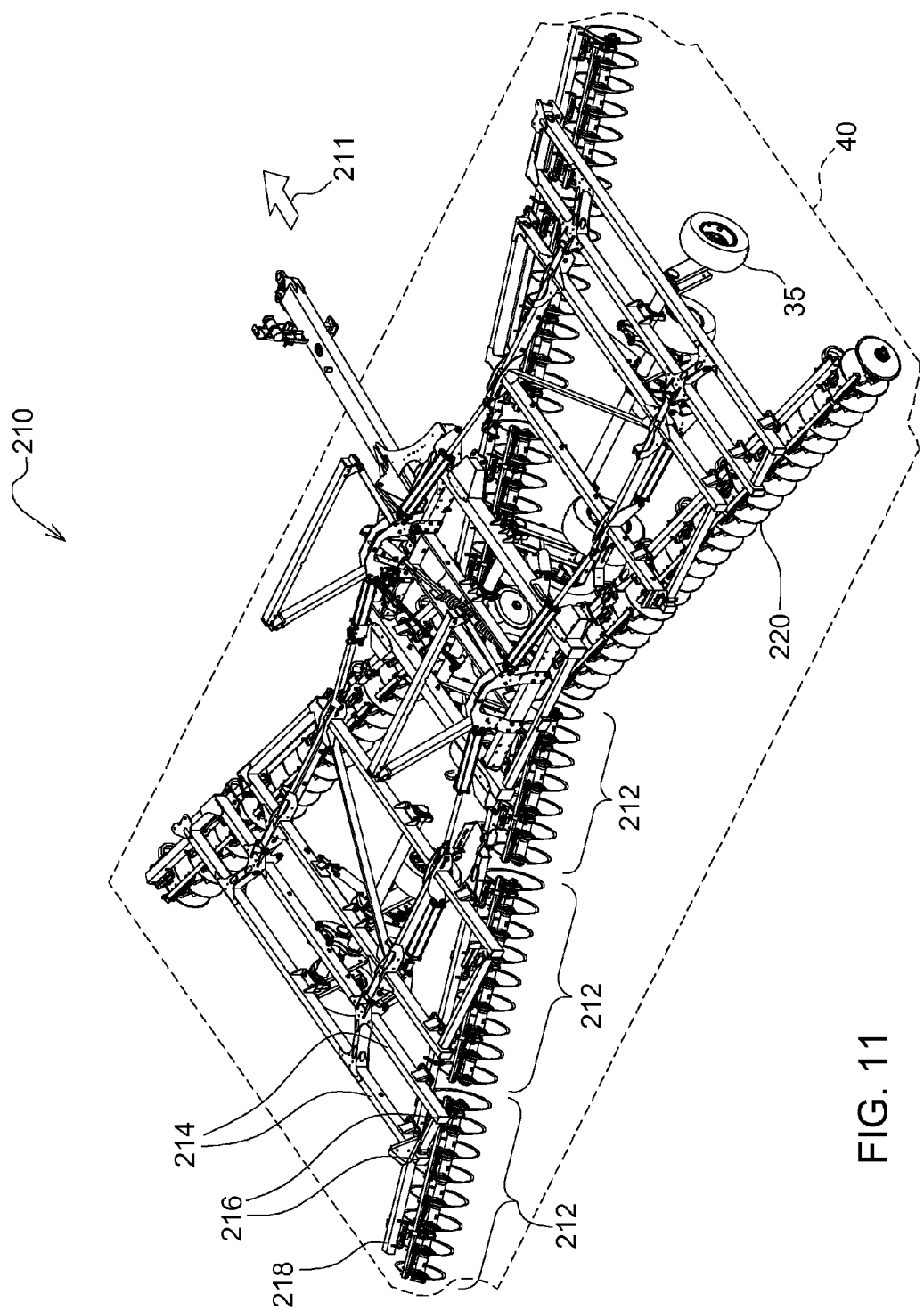
FIG. 11 depicts an example ground working implement containing a disk gang having C-springs with corresponding overload spring.

FIGS. 1 and 2 depict an example disk bearing standard arrangement 10 for use, together with like standard arrangements 10, in an agricultural implement (e.g. FIG. 11). The standard arrangement 10 mounts disks 220 to a disk gang (e.g. 212 of FIG. 11) or other rotatable ground-working tool arrangement, such as a rolling basket to a bracket carried by a tool support tube or beam of a frame of the agricultural implement. U.S. Pat. No. 8,413,739, granted on Apr. 9, 2013, discloses such an agricultural implement and is incorporated herein by reference in its entirety. The arrangement 10 includes a main C-spring 12 with a C-shaped or U-shaped spring member having parallel upper and lower legs 14 and 16, respectively, joined by a bight 18. The upper leg 14 is a mounting portion which underlies and is fixed, as by upper and lower front mounting plates 20 and 22, a front pair of clamping bolts 24 and a rear mounting bolt 26, to a standard mounting bracket (not shown) carried by a tubular tool-carrying frame member of the implement. A rear region of the lower leg 16 is engaged with, and is secured, as by mounting connectors such as bolts 28, to a top surface of, a split bearing housing 30 containing a bearing adapted for being received on an axle shaft (not shown) of a disk gang 212.

The arrangement 10 further includes an integral strap bent to form a combined overload spring and disk scraper support arrangement 32 including a straight mounting section 34 located between and joined to a rear end of an overload spring 36 and a front end of a disk scraper support section 38. The rear region of the standard lower leg 16 is sandwiched between the mounting section 34 and the bearing housing 30 by the mounting bolts 28. The overload spring 36 includes an upward and rearward inclined straight (planar or flat) leg portion 40 having a lower end joined to a forward end of the mounting section 34 by a curved portion 42 formed at a radius r (see FIG. 2) and having an upper terminal end 44 spaced a predetermined distance h below a lower surface of the standard upper leg 14. The scraper support section 38 is angled upward and to the rear from the rear end of the straight (planar or flat) mounting section 34 (lower leg of overload spring 36). While the straight mounting section 34 serves as the mounting section both for the overload spring and for the disk scraper support, the mounting section 34 is considered as primarily forming a lower leg part of the overload spring. Moreover, in another application of the combination spring 100, the scraper support may not be used or is optional. The straight mounting section 34 and straight spring section 40 be considered as divergent legs or limbs which are joined to each other by an arcuate section with the legs being disposed so as to so as to make an angle of 40°-50° with respect to each other. The angles stated in this disclosure are within measurement errors or manufacturing tolerances of about 1 to 2 degrees or depending on the manufacturing methods.

When the disk gang 212 is operating under normal working conditions, the main C-spring 12 will flex up and down together with like standards associated with the disk gang 212 and provide an acceptable shock absorption and energy dissipation, preventing damage to disk gang 212 components. During this normal operation, the main C-spring 12 does not flex to the extent that the overload spring 36 offers any resistance to such flexure. However, when the disk gang 212 is operating under rocky or other unfavorable conditions, the main C-spring 12 may be overloaded such that it will flex to the extent that the terminal end 44 of the overload spring 36 will come into contact with the underside of the standard upper leg 14 and will be loaded downwardly so as to increase the overall spring rate of the system to prevent yielding/damage to the main C-spring 12 and/or damage to the machine frame and disk blades.

Figure 3:
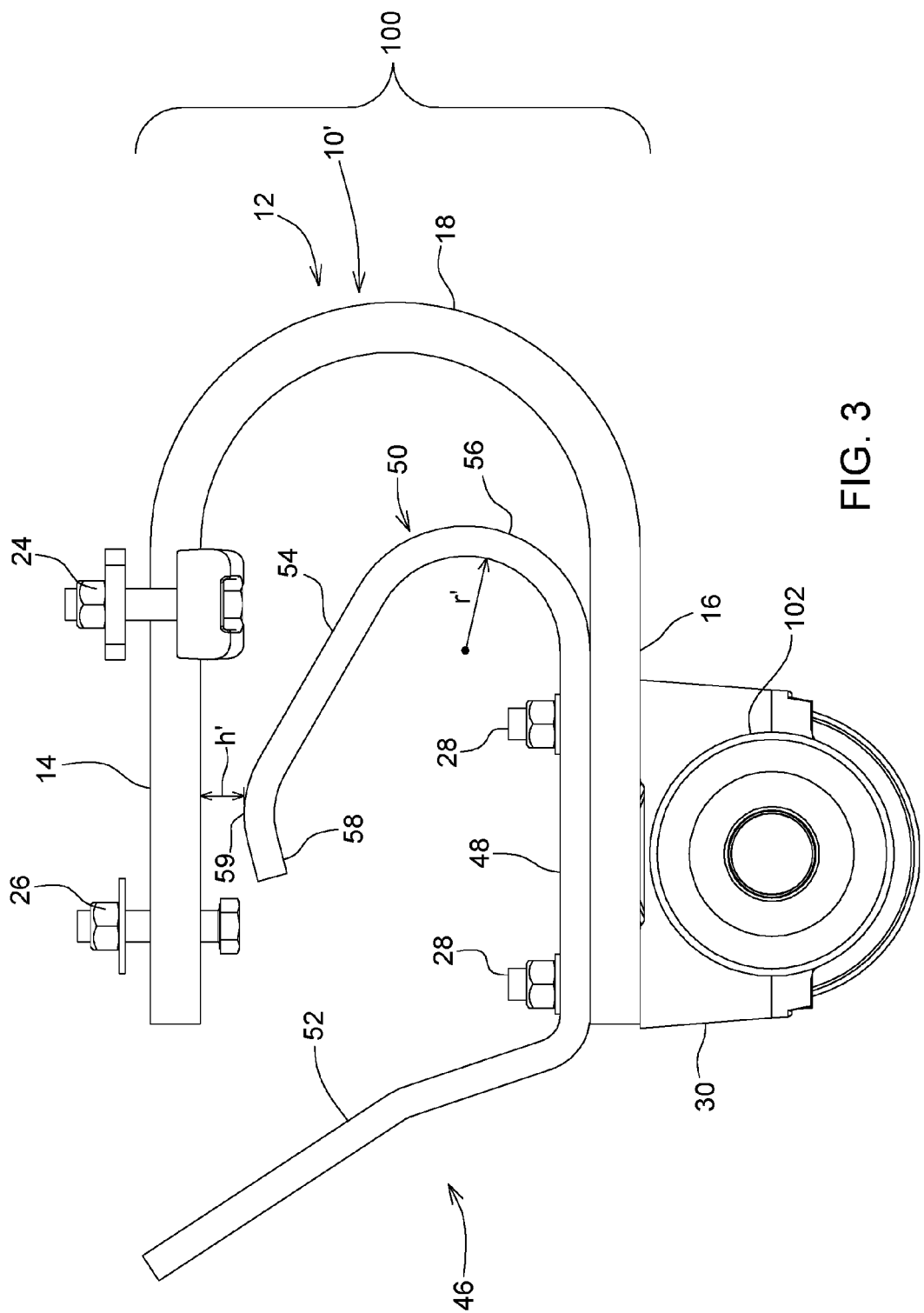
FIG. 3 depicts another example embodiment of a C-shaped spring with an overload spring.

Referring now to FIG. 3, there is shown a second embodiment where the reference numerals of components common to those of FIG. 1 are identically referenced. Thus, shown is a standard arrangement 10' which includes an integral strap bent to form a combined overload spring and disk scraper support arrangement 46 including a straight mounting section 48 located between and joined to a rear end of an overload spring 50 and a front end of a disk scraper support section 52. The rear region of the standard lower leg 16 is sandwiched between the mounting section 48 and the bearing housing 30 by the mounting bolts 28. The overload spring 50 includes an upward and rearward inclined straight (planar or flat) spring leg portion 54 having a lower end joined to a forward end of the mounting section 48 by an arcuate or curved spring portion 56 formed at a radius r', which is about half that of radius r of the first embodiment. The upper end of the straight spring leg portion 54 is joined to a slightly downwardly inclined straight end portion 58 by a slightly curved portion having an upper curved surface 59 spaced a predetermined distance h' below a lower surface of the standard upper leg 14. This curved portion with the curved surface 59 is one difference between this second embodiment and the first embodiment, with another difference being that the straight spring leg portion 54 is longer than the straight leg portion 40 of the first embodiment, which results in the distance h' being less than the distance h. An advantage of this second embodiment over the first embodiment is that the curved surface 59 presents a smooth surface for being engaged by the bottom surface of the upper standard leg 14, which would result in less wear to the leg 14. However, the first embodiment may be cheaper to manufacture and the terminal end 44 tends to round during usage; alternatively, terminal end 44 is beveled or rounded during manufacturing to provide a smoother impact. Regardless, either the first embodiment or the second embodiment can be inverted so that the overload spring 50 is attached to the upper leg 14 of the main C-spring 12.

Figure 4:
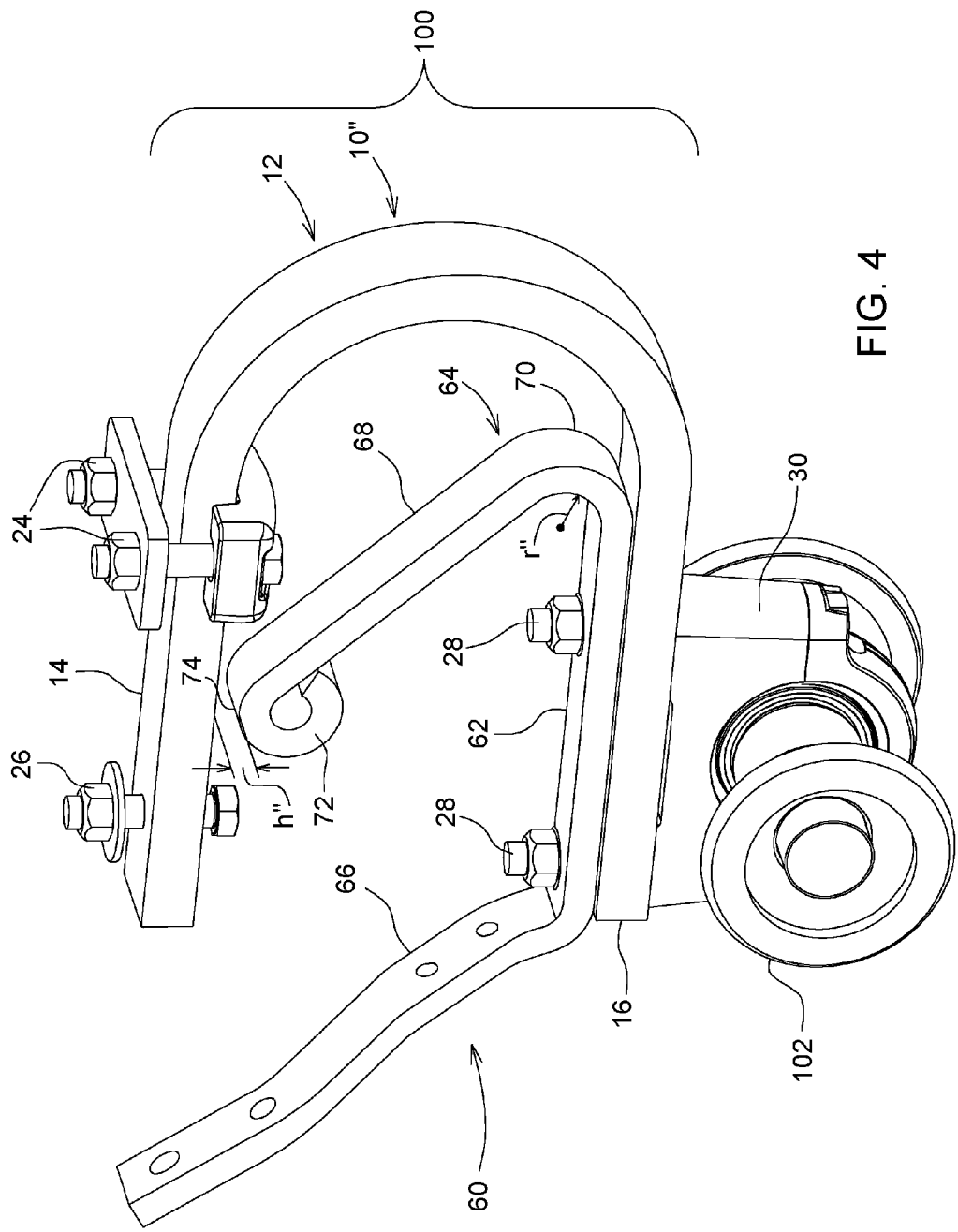
FIG. 4 depicts another example embodiment of a C-shaped spring with an overload spring.

Referring now to FIG. 4, there is shown a third embodiment where the reference numerals of components common to those of FIG. 1 are identically referenced. Thus, shown is a standard arrangement 10" which includes an integral strap bent to form a combined overload spring and disk scraper support arrangement 60 including a straight mounting section 62 located between and joined to a rear end of an overload spring 64 and a front end of a disk scraper support section 66. The rear region of the standard lower leg 16 is sandwiched between the mounting section 62 and the bearing housing 30 by the mounting bolts 28. The overload spring 64 includes an upward and rearward inclined straight spring leg portion 68 having a lower end joined to a forward end of the mounting section 62 by an arcuate or curved spring portion 70 formed at a radius r", which is about half that of radius r of the first embodiment and radius r' of the second embodiment. The upper end of the straight spring leg portion 68 is joined to an end region formed into to a substantially cylindrical eye 72 having a curved upper surface 74 spaced below the leg 14 by the distance ah h" instead of just having a curved portion with curved surface 59 joined to a short end portion 58 like that of the second embodiment. Like the curved surface 59 of the second embodiment, the upper surface 74 presents a smooth surface for engaging the standard leg 14 so as to reduce wear to the leg when compared to its engagement with the straight terminal end of the straight leg portion of the spring section of the first embodiment. However, the first embodiment may be cheaper to manufacture and the terminal end 44 tends to round during usage; alternatively, terminal end 44 is beveled or rounded during manufacturing to provide a smoother impact. Regardless, the location of the overload spring 64 can be inverted so as to be attached to the upper leg 14 of the main C-spring 12.

Like the scraper support sections 38 and 52, of the first and second embodiments, respectively, the scraper support section 66 is angled upward and to the rear from the rear end of the straight leg section 62. Also, like the first embodiment, the straight mounting section 62 and straight spring leg portion 68 are considered to be divergent legs or limbs of the overload spring 64 which are joined together by the arcuate spring portion 70, with the mounting section 62 and leg portion 68 being disposed to make an angle of about 45°-50° with each other.

Referring now to FIGS. 5 and 6, there is shown a fourth embodiment where the reference numerals of components common to those of FIG. 1 are identically referenced. Thus, shown is a standard arrangement 10''' which differs from the arrangement 10 by there being an overload spring 80 and a disk scraper mount 82 that are separately constructed, and by the overload spring 80 being mounted to the underside of the upper leg 14 of the main C-spring 12 for being supported by the frame. The embodiment of FIGS. 5 and 6 are similar to that of FIGS. 1 and 2 with respect to the overload springs 80 and 36 both having a straight or flat piece projected into the space between the combination spring 100. The straight pieces form an angle of approximately 45-50 degrees with respect to the particular leg of the main C-spring 12, to which the overload spring 36 or 80 is attached. In a sense, the example overload spring of FIGS. 5 and 6 is almost an inversion of the overload spring of FIGS. 1 and 2. In a like manner, the embodiments of overload springs depicted in FIGS. 3 and 4 may also be inverted and be attached to the upper leg 14 of the main C-spring 12.

Specifically in FIGS. 5 and 6, the overload spring 80 is formed by a bent strap and includes upper and lower divergent straight (flat or planar) legs 84 and 86, respectively, interconnected by a forward curved section 88 so as to be substantially V-shaped, with the radius of curvature r'' of the section 88 being about two thirds of the radius of curvature r of the curved portion 42 of the overload spring 36 of the first embodiment. The upper leg 84 defines a mounting section and is engaged with the lower surface of the upper standard leg 14, with the rear mounting bolt 26 that is used for securing the main C-spring 12 to the implement frame also being used for mounting the overload spring 80 to the frame. For preventing the overload spring 80 from pivoting about the bolt 26, the rear end of the upper leg 84 is provided with a lip or ledge 90 that engages a rear end surface 92 of the upper leg 14.

The separate scraper mount 82 includes a straight mounting section 94 clamped in sandwiching relationship to the rear region of the lower leg 16 of the main C-spring 12 by the mounting bolts 28 which pass through aligned sets of mounting holes provided in the mounting section 74, lower leg 16 and bearing housing 30. A scraper support section 96 of the scraper mount 82 is angled upward and to the rear from, and is joined to a rear end of, the mounting section 94.

The lower leg 86 of the overload spring 80 has a lower end 98 spaced above an upper surface of the mounting section 94 of the scraper mount 82 by a preselected distance, with the lower end 98 being located for contacting an area of the mounting section 94 between the mounting bolts 28 when the main C-spring 12 is deflected up and down through said preselected distance in response to being subjected to an overload.

In the example embodiments of FIGS. 1-6, only one end of the inner spring is attached to the main C-spring 12. The free end of the inner spring is characterized by its distance h from the main C-spring 12. It is also possible to specify the angle with which the straight leg section (e.g. 40 in FIG. 1) makes with lower leg 16 or upper leg 14. The angle ranges from 45 to 80 degrees, with 45 degrees generating a lower spring rate than 80 degrees would. In an agricultural application to carry disks 220, the thickness of the main C-spring 12 is about 30-35 mm. The outer width of the main C-spring 12 is about 280-300 mm. The outer length of the main C-spring 12 is about 480-500 mm. The outer radius of curvature for the bight section 18 is about 140-150 mm. As the cultivators and rippers get larger and the disks 220 become larger, the dimensions of the main C-spring and corresponding inner overload spring increase.

FIGS. 7-10 depict example nested springs like in previous figures, but both pairs of legs of the respective two springs are joined together rather than just one pair of the legs. The double C-springs again increase the robustness of a single C-spring for certain types of soil and/or travel conditions. FIG. 7 depicts a combination spring 100 again having a main C-spring 12 having parallel upper and lower legs 14 and 16, respectively, joined by a bight 18. A smaller inner spring 110 follows the form of the main C-spring 12, again having extended planar (flat) legs, but is spaced apart at least 1.5 inches from the main C-spring 12 at the center region of the bight 18. The upper leg 14A of the inner spring 110 contacts and joins with the upper leg 14 of the main C-spring 12. There is a clasp or bolt that ties leg 14A and leg 14 together. In addition, such as when the combination spring 100 is used to hook onto a frame tube, there is a mounting plate 120 above and a mounting plate 122 below the legs 14A and 14 to further secure legs 14A and 14 together. The mounting plates are bolted or clamped together by for example bolts 124 and pins 118. In this example, the upper mounting plate 120 is manufactured as an integral part of the upper leg 14 of the main C-spring. Alternatively, pins 118 have interlocking ridges or lip (not visible) to keep the upper mounting plate 120 clamped to upper leg 14. The upper mounting plate 120 is mated with a top plate 116 that is bolted or clasped by 114 to the pins 118, which together defines a hole or loop through which a tube or bar may be inserted. This is one way to position many combination springs 100 on a disk gang axis tube 218 (e.g. FIG. 11).

Figure 10:
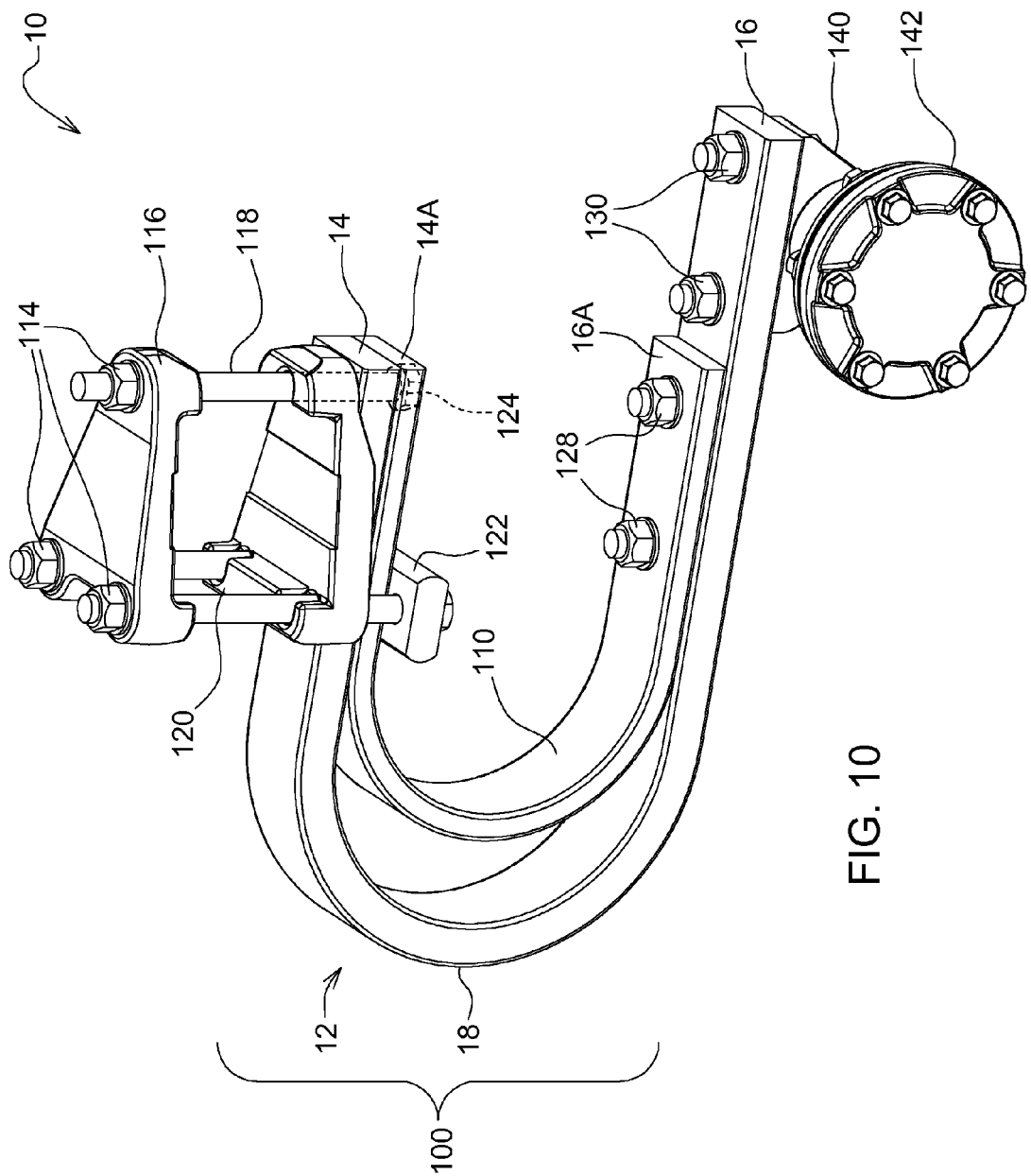
FIG. 10 depicts another example embodiment of a C-shaped spring with an overload spring.

FIG. 7 also depicts an example of how the lower legs 16A and 16 of the inner spring 110 and main C-spring 12, respectively, are coupled together by clasps or bolts 128. The lower leg 16A of inner spring 110 meets part way along the lower leg 16 of the main C-spring 12 so as to leave room for additional clasps to attach other objects to the lower leg 16. In this example, a triangular ring 140 is attached to lower leg 16 by bolts 130. As with any of these embodiments, the methods to attach additional pieces include bolts, u-bolts, rivets, straps and so on. Sometimes, welding is also possible such as between lower leg 16 and the triangular ring 140. While FIG. 7 depicts a right rear perspective view of the combination spring 100, FIG. 8 depicts a side view that shows the relative proportion of the curvature of the bight 18 to the bight of the inner spring 110. The thickness of the inner spring 110 is about 80-90% of the thickness of the main C-spring 12. Both springs compress together upon impact with the soil and the weight located above the combination spring 100. FIG. 9 depicts a front right perspective view of the combination spring 100. FIG. 10 depicts a top right perspective view of the combination spring 100 together with a spool 142 whose axle is inserted in the triangular ring 140. A disk 220 or other object may be mounted on the axle between the spool 142 and the triangular ring 140.

Figure 15:
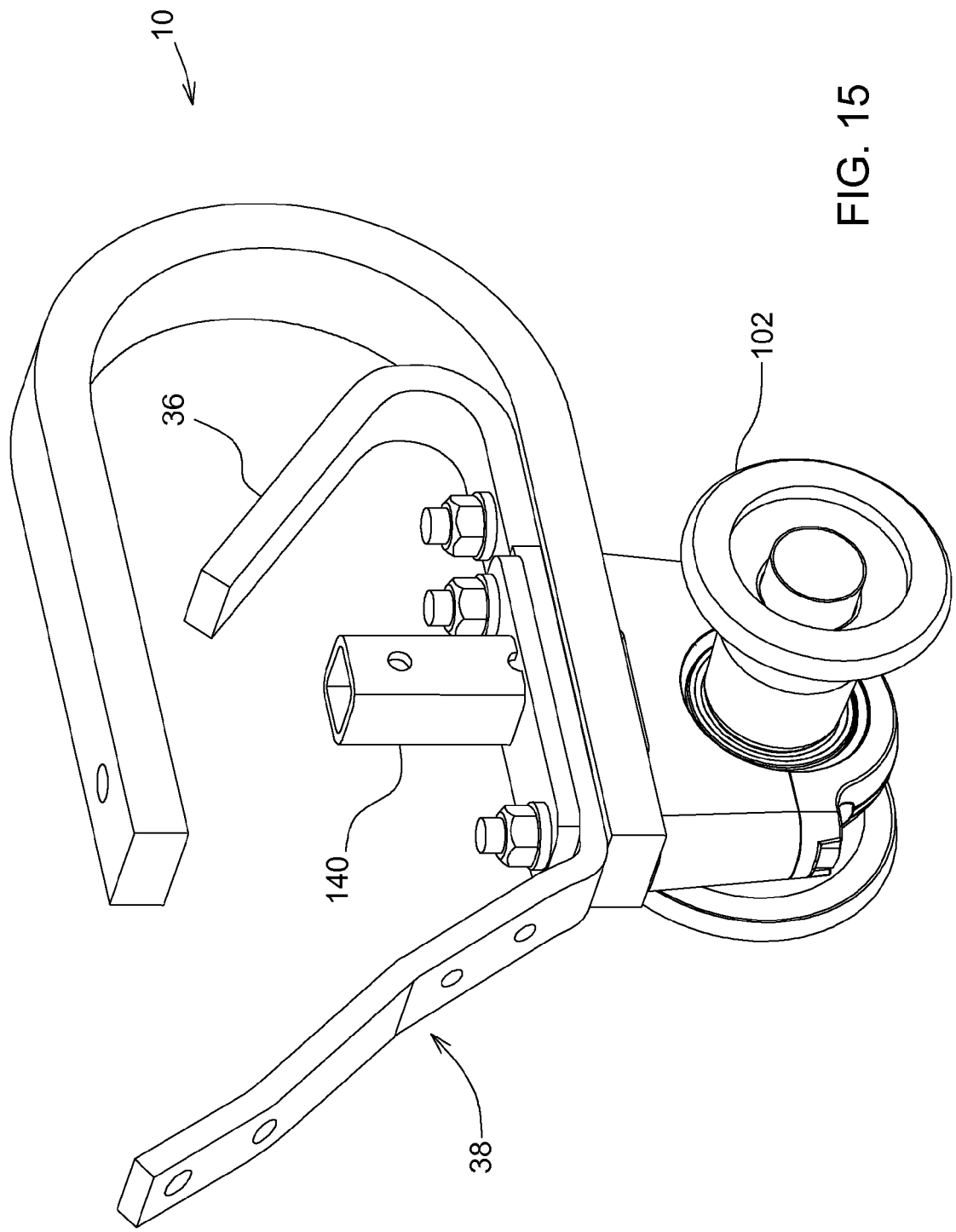
FIG. 15 depicts an example of a C-shaped spring with a hard stop and an overload spring.
Figure 16:
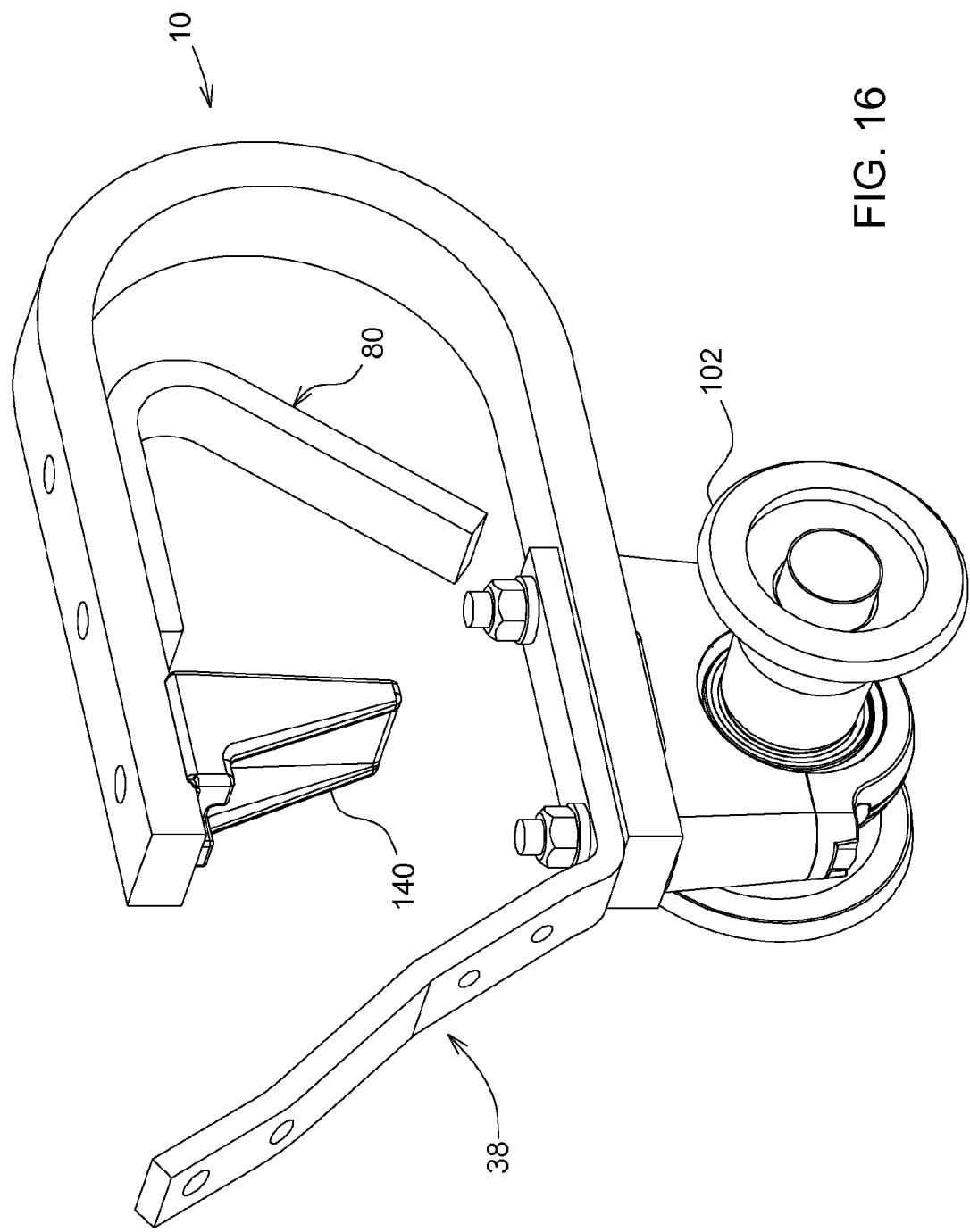
FIG. 16 depicts another example of a C-shaped spring with a hard stop and an overload spring.
Figure 17:
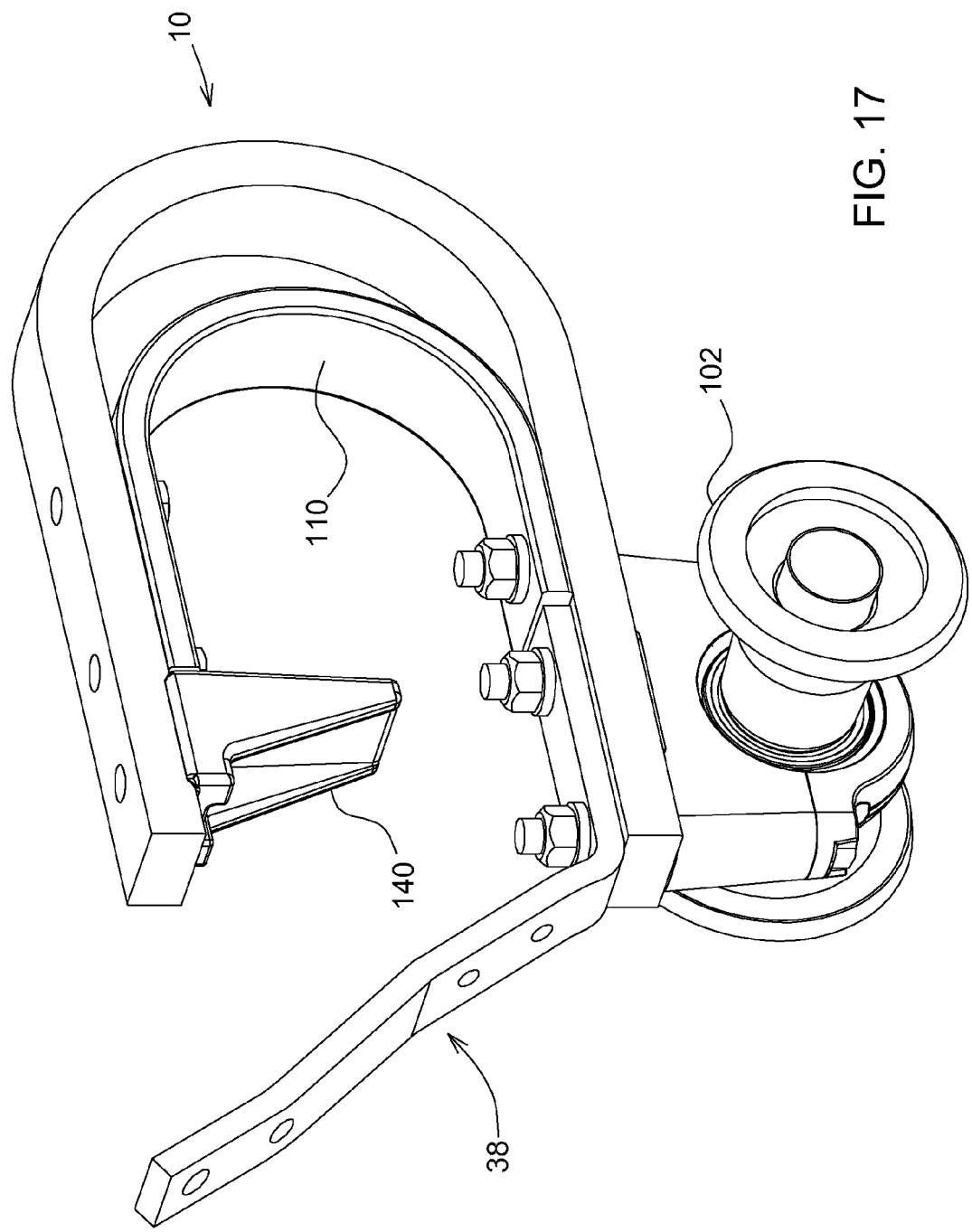
FIG. 17 depicts another example of a C-shaped spring with a hard stop and an overload spring.

In yet another embodiment, a single S shaped spring (not shown) is used in the agricultural implements to absorb shock because the stresses on an S shaped spring are reduced for certain types of soil and/or travel conditions as compared to a C-shaped or U-shaped spring. Nested or double S structures are also another configuration for the springs. In yet another embodiment, a hard-stop (non-spring) is introduced. FIGS. 15-17 depict examples of a combination spring 100 with a hard stop protrusion 140. A hard stop protrusion 140 forms a 90 degree angle from the spring leg to which it is mounted. The hard stop protrusion 140 is shorter than the height of the free leg or non-tied leg of the V-shaped inner overload spring (e.g. 36). Upon a large impact, the overload spring first takes effect before the hard stop protrusion 140 does. The hard stop 140 suddenly changes the spring rate and stops the legs 14 and 16 of the main-C spring 12 from collapsing together. FIG. 15 depicts an example hard stop protrusion 140 together with the combination spring 100 shown in FIGS. 1-4. FIG. 16 depicts an example hard stop protrusion 140 together with the combination spring 100 shown in FIGS. 5-6. FIG. 17 depicts an example hard stop protrusion 140 together with the combination spring 100 shown in FIGS. 7-10.

In a manufacturing example, the depicted embodiments of the combination spring 100 are made of SAE 5160 spring steel. Alternatively, the inner and main C-spring are made of other or different materials so that the two springs have different properties (e.g. elasticity and resilience). Further the material may be treated or coated to alter its properties. For instance, the hardness can be controlled by post-forming heat treatment; a difference in the hardness between the parts may be one way to set the desired spring rates.

In usage, in addition to agricultural settings, the construction, mining, forestry and industrial environments also benefit from more reliable C-springs. For instance, in a construction or a mining environment, vehicles with many tons of equipment travel over very rocky or rough roads. The agitator boxes, shaker screens, sorting and grading equipment benefit from the addition of sturdy shock absorbers to lengthen the life of the equipment. The combination springs may be added to the equipment to damp out shocks and collisions. One embodiment adds combination springs to hydraulic springs so that the design of the hydraulic springs may be more relaxed and/or cheaper to manufacture. Further, at a microscopic level, such as in MEMs (micro-electrical-mechanical) devices, a simplified spring involving improved combination springs is beneficial due to factors such as cost-effectiveness, simplicity and durability. Such micro-combination springs are also easier to fabricate and may be used as part of an actuator system to provide damping and shock absorption.

Turning now to example agricultural applications and usages of combination spring 100, FIG. 11 depicts an example earth working implement 210 (e.g. a disk ripper) that includes a plurality of disk gangs 212, each suspended from a frame member 214 by at least two support assemblies 216. Each disk gang 212 includes an elongated gang axis tube 218 upon which a plurality of combination springs 100 are mounted in a fixed axial spaced relationship (e.g. 10 to 20 inches apart or depending on the crop planted). A ring or rectangular opening 106 is attached to the top of the main C-spring 12 in order to mount the combination springs 100 to the gang axis tube 218. For instance, the ring 106 slides underneath plate 20 and is attached by clamping bolts 26 and rear bolts 26 to the top of the main C-springs 12. Bolted to the lower leg of each main C-spring 12, a bearing housing 30 and spool 102 hang below the main C-spring 12 so that soil-cutting disks 220 are mounted to the spool 102 or to an axle corresponding to the spool.

Regarding the operation of an example agricultural systems containing the combination springs 100, the earth working implement 210 is pulled by a motor vehicle (not shown) moving in the direction of the arrow 211 shown in FIG. 11. The disks 220 are pulled through the soil primarily in a direction of the arrow 211 and at a desired angle with respect to the vertical plane of each disk 220. The passage of the disks 220 through the earth may produce working forces that act against the disk gangs 212. The working forces may act unevenly upon the disk gang 212, for example due to uneven soil, when some of the disks 220 are deeper in the earth than others. As the soil pushes against a disk 220, the legs 14 and 16 of the main C-spring 12 connected to the disk 220 compress. The legs 14 and 16 move towards each other because the weight of the earth working implement 210 is downward while the soil is pushing up against the disk 220 and thus also against the main C-spring 12. The main C-spring 12 does not collapse due to its own elasticity. During low impact (e.g. smooth terrain) on the disks 220, only the main C-spring 12 is affected and the inner spring remains undisturbed since it is spaced apart from the main C-spring 12.

During larger impacts when the main C-spring 12 overly compresses, the inner springs (e.g. 36 or 50) prevent the legs 14 and 16 from collapsing. The legs 14 and 16 hit the inner spring 36 or 50 when the predetermined distance h or h', respectively, is reached. Since the top 59 of inner spring 50 is curved, the impact force is spread out over a rounded large surface area. By contrast, the terminal end 44 of inner spring 36 comes together at an edge 45 (90 degrees) such that the impact force on that edge 45 (FIG. 2) is not spread out and there is much pressure at the edge. To reduce the pressure, the edge is instead beveled and flattened to a planar surface that is parallel to the under-surface of the leg 14. Or as another alternative, the edge 45 is rounded to reduce or spread out the amount of pressure a sharp edge 45 would otherwise receive. Likewise, the surface of the lower end 98 of inner spring 80 is beveled or rounded to reduce the pressure placed on inner spring 80. In many of the example embodiments, the thickness of the inner spring is smaller than that of the main C-spring 12 because it receives only a secondary force after the main C-spring. The effect of the high force impacts may also be characterized in terms of changing the spring rate of the main C-spring 12. When the force is high enough to cause the free end of the inner spring to contact the main C-spring 12, both springs are engaged and the spring rate of the combination spring 100 suddenly increases to resist the force of the loads (e.g. soil and weight of the agricultural implement). The larger the space or distance between the main C-spring 12 and the inner spring, the larger the external force needs to be before the inner spring engages.

The secondary inner spring 36, 50, 64 or 80 stops or cushions to prevent the legs of the main C-spring 12 from compressing together beyond a threshold distance. As an alternative, in FIGS. 7-10, the ends of the secondary inner spring 110 are both bolted to respective ends of the main C-spring 12, akin to a double C-spring in appearance. The combination spring 100 of FIGS. 7-10 acts together through both light force loads and heavy force loads (0 to over 6000 pounds), and the spring rate of the combination spring 100 is higher than either spring alone. Like the other designs of FIGS. 1-6, having two springs reinforces each spring individually. The double C-spring may be used in various situations including as a disk bearing standard. A bearing housing 30 and spool 102 hang underneath the combination spring 100 so that soil-cutting disks may be mounted to the spool.

Figure 12:
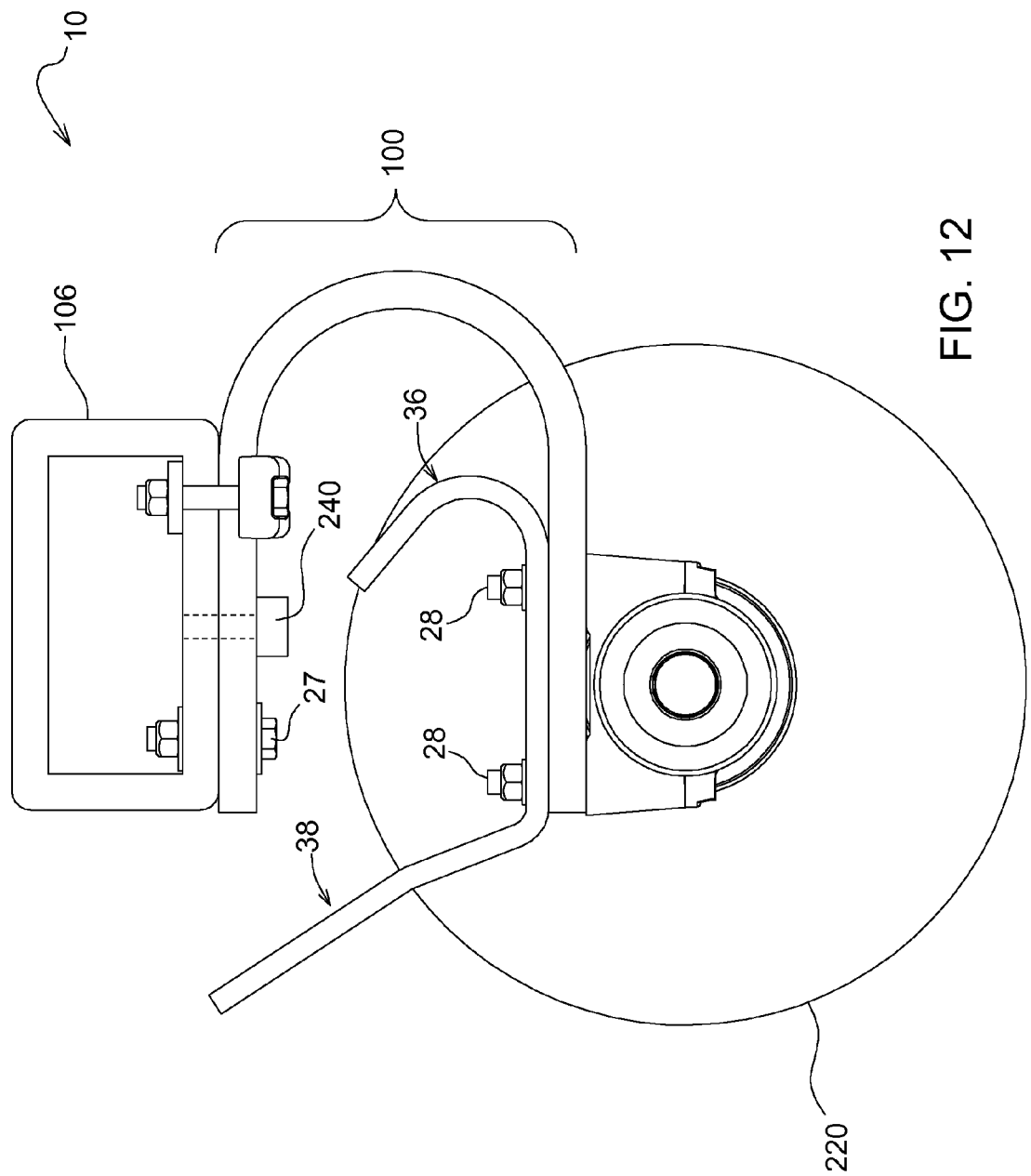
FIG. 12 depicts an example disk mounted on a disk bearing standard with a combination spring, where the disk bearing standard includes a sensor.

FIG. 12 depicts an example disk 220 mounted on a disk bearing standard with a combination spring 100, where the disk bearing standard 10 includes a distance sensor 240 located between the bolts on the underside surface of the upper leg 14. The height of the bolts and mounting plate 22 is greater than the height of the distance sensor 240 so that sensor 240 is protected and would not normally contact anything. Alternatively, distance sensor 240 is mounted between bolts 28, onto the flat edge 34 and communications are performed wirelessly because there is no nearby wiring available. Sensor 240 detects when the legs 14 and 16 (or 34) of the combination spring 100 are permanently compressed together from its nominal distance apart, which indicates a major failure in the combination spring 100. Alternatively, sensor 240 is used to monitor how much compression and expansion occur during normal operation to help designers or the operators understand vibrational motion of the springs under various working conditions. FIGS. 5 and 6 also depict an example distance sensor 240 mounted to the underside of the upper leg 14 to measure distances between the legs 14 and 16 of the main C-spring 12.

Distance sensor 240 is for example a proximity sensor in an integrated circuit package having a laser beam transmitter (e.g. laser, amplifier, laser driver circuits), receiver (e.g. photo-detector, pre-amplifier circuits) and detector circuits (comparator and logic circuits). Alternatively, inductive proximity sensors are used to detect the metallic opposing leg. Simple ones can now detect distances to within a few millimeters accuracy and their precision should increase in the future along with an accompanying reduction in cost. For an agricultural disk bearing standard 10, damage is indicated by permanent spring distortion distances larger than about 20 mm so that the distance sensor 240 has the sensitivity to detect or monitor normal performance versus permanent damage. The distance sensor 240 checks over time (many clock cycles) the observed distances. The distance sensor 240 projects a laser beam down to the lower leg 16 and detects the reflected light to compute a distance between two legs such as legs 14 and 16. A small hole is drilled in the upper leg 14 allowing the distance sensor 240 to be wired to the central communications system (e.g. CAN-bus). Wiring is routed from the back of the distance sensor 240 through the small hole or around the surface of the leg 14 to join the central bus wiring running through the hollow of the disk gang axis tube 218, then to the implement frame and to the central computer 302 in a cab of a tractor or elsewhere.

The example distance sensor 240 is used to optimize performance and alert operators of possible problems. Or it is used take steady operational data for later analysis and calibration to optimize design and performance. In practice, springs may fail through metal fatigue, where they suddenly crack after being repeatedly moved back and forth, especially in harsh agricultural or construction or mining conditions. At the microscopic level, no spring is completely elastic: every time it goes through a stretching cycle (stretching or compressing and then returning to its original size), its internal structure is altering very slightly and tiny "micro-cracks" may be forming and growing inside it. At some point in the future, it tends to fail: e.g. the spring will break when a crack grows big enough. Springs may also go past their elastic limit when they absorb a shock force that is more than the maximum energy they can tolerate and the spring becomes permanently distorted, which may be detected by distance sensor 240.

Figure 13:
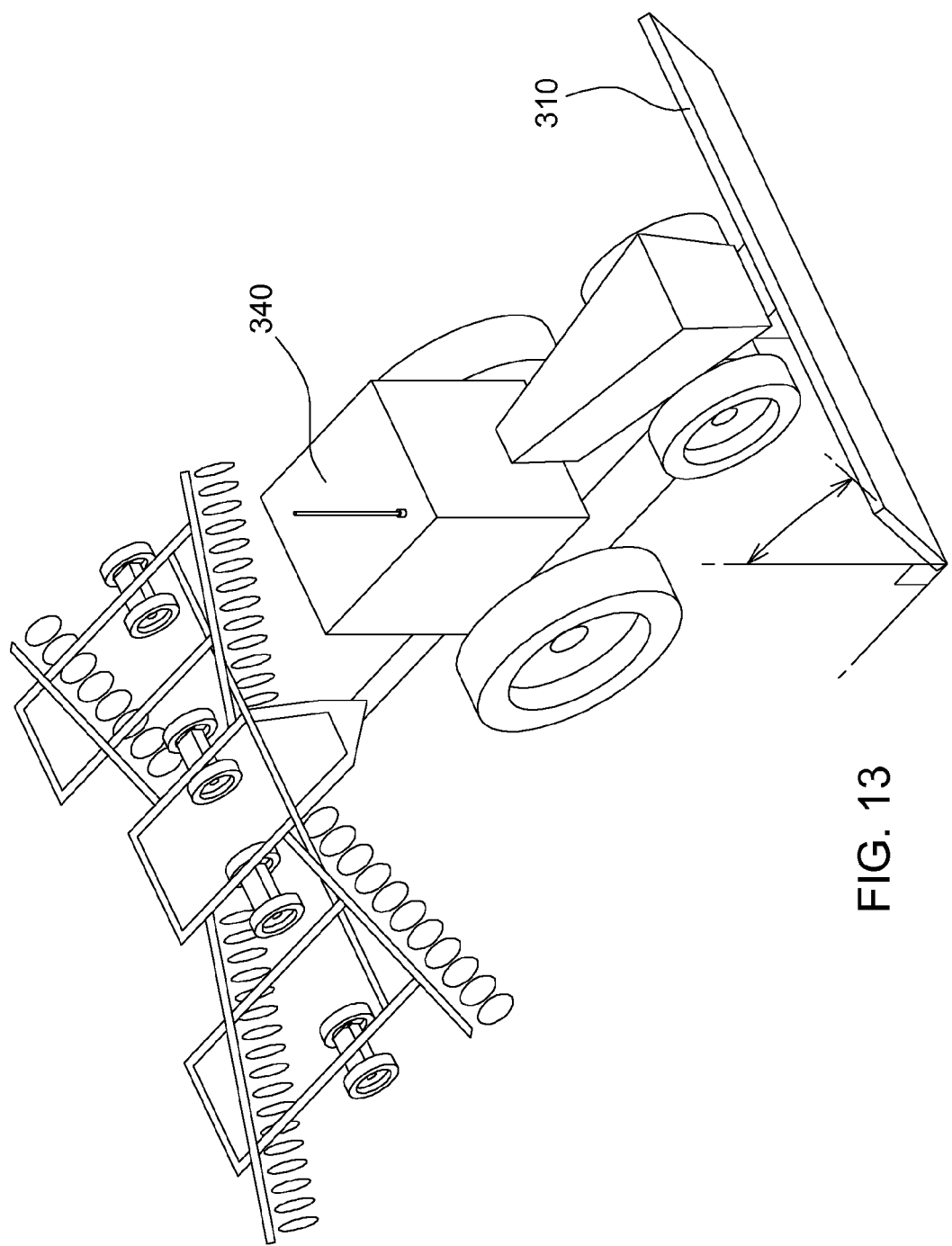
FIG. 13 depicts an example sensor arrangement in which C-springs with overload springs operate.

To prevent further damage to the combination springs 100 and disks 220, FIG. 13 depicts a tractor having an antenna 340 and an example sound or sonar signals transmitter and receiver (rock sensor 310) to detect large rocks and other objects underneath the soil surface. In one embodiment, rock sensor 310 is mounted to the front fender of the tractor or along the axle of the vehicle. Rock sensor 310 spans the width of the implement (e.g. agricultural ripper, harrow, cultivator, disk, combination tool) that the vehicle is towing. Rock sensor 310 is box-like and tilted at an angle $\phi$ with the transmitters pointed towards the ground, where the angle is adjustable to optimize the search region. Objects larger than about 6-10 inches are detected by rock sensors 310 using an ultrasound echo method or other sonar techniques. Rock sensor 310 has a probe to transmit waves via the antenna 340 into the soil. The probe is made of piezoelectric crystal (PZT) elements that generate the waves when a high voltage pulse is applied to the PZT elements that subsequently expands and creates pressure pulses or wave signals. Reflections from the transmitted waves yield different frequencies depending on whether the transmitted waves encounter dense rocks as opposed to softer soil. With high speed electronics, it is possible to receive signals from the antenna and take two or three reflection wave samples within the approximately 5-10 mph travel time of the vehicles towing the combination springs 100 and disks 220. Oversampling or averaging improves the signal to noise ratio and/or reduces the risk of false readings. Alternatively, to speed up processing, if the frequency of the sample signal lies within some window of values indicating a rock, then another signal sample is taken. Otherwise, rock sensor 310 simply analyzes the next soil region.

In another embodiment, rather than using ultrasound echo, rock sensor 310 has circuits to transmit and receive high frequency radar signals with very low noise levels allowing sampling the ground signal reflection. In various embodiments, different forms or algorithms for GPR (ground penetrating radar) may be used depending on soil type or soil moisture. Subsequent filters and signal conditioning circuits clean the received reflected signals and then wave analysis and comparator circuits distinguish hard objects from softer soil. The comparator circuits (not visible) optionally have built in hysteresis circuits to prevent false reads due to fluctuations as the vehicle is bouncing along on rough terrain. Alternatively, sub-surface soil mapping is conducted prior to vehicle travel and the information is stored in the memory of computer 302. Since rocks underneath the soil tend to remain in the same location, a single pre-mapping should remain constant for at least a couple of years. Sub-surface mapping for landmines are conducted by the military with a small sweeper truck; a similar technique is used by substituting the appropriate sensors and rock analysis. For certain types of soil (e.g. clay soils or salty soils), preliminary mapping sometimes works better because extra analysis may be required. The pre-map, together with dynamically obtaining the vehicle location data from GPS or local location guide posts, allows computer 302 to calculate that a large rock is in the path of travel and alert the operator or stop/slow down the vehicle. But sensor technology is now improving to the point that real time sampling becomes more and more rapid and reliable to detect rocks so that as the vehicle travels, the vehicle's computer 302 can dynamically analyze the data and decide whether to take action when a large object below the soil is detected. For example, the computer 302 can alert the operator and/or slow down the vehicle. By slowing down, the force impacting the disks 220 and combination springs 100 is reduced so that damage to the equipment is less likely to occur. Alternatively, particular disk gangs 212 can be raised somewhat such as by several inches. Because the location of the vehicle is known (e.g. GPS), and the geometrical distance of the disk gangs 212 is known relative to the location of the vehicle and rock sensor 310 and thus also to the detected rocks, it is possible to calculate which disk gang 212 should be raised several inches to avoid the larger rocks.

In the FIGS. 12-13, the example distance sensor 240 and rock sensor 310 are depicted individually in the context of combination springs 100. In other embodiments, the distance sensor 240 and rock sensor 310 can also be used together. Alternatively, distance sensing and rock sensing are performed with just a C-shaped spring or a U-shaped spring alone rather than with a nested overload inner spring. Or distance sensing and rock sensing are performed with just a C-shaped spring or a U-shaped spring having a hard stop protrusion 140. The sensors help detect or prevent failures to the C-shaped spring, or provide data to monitor routine travel performance.

Figure 14:
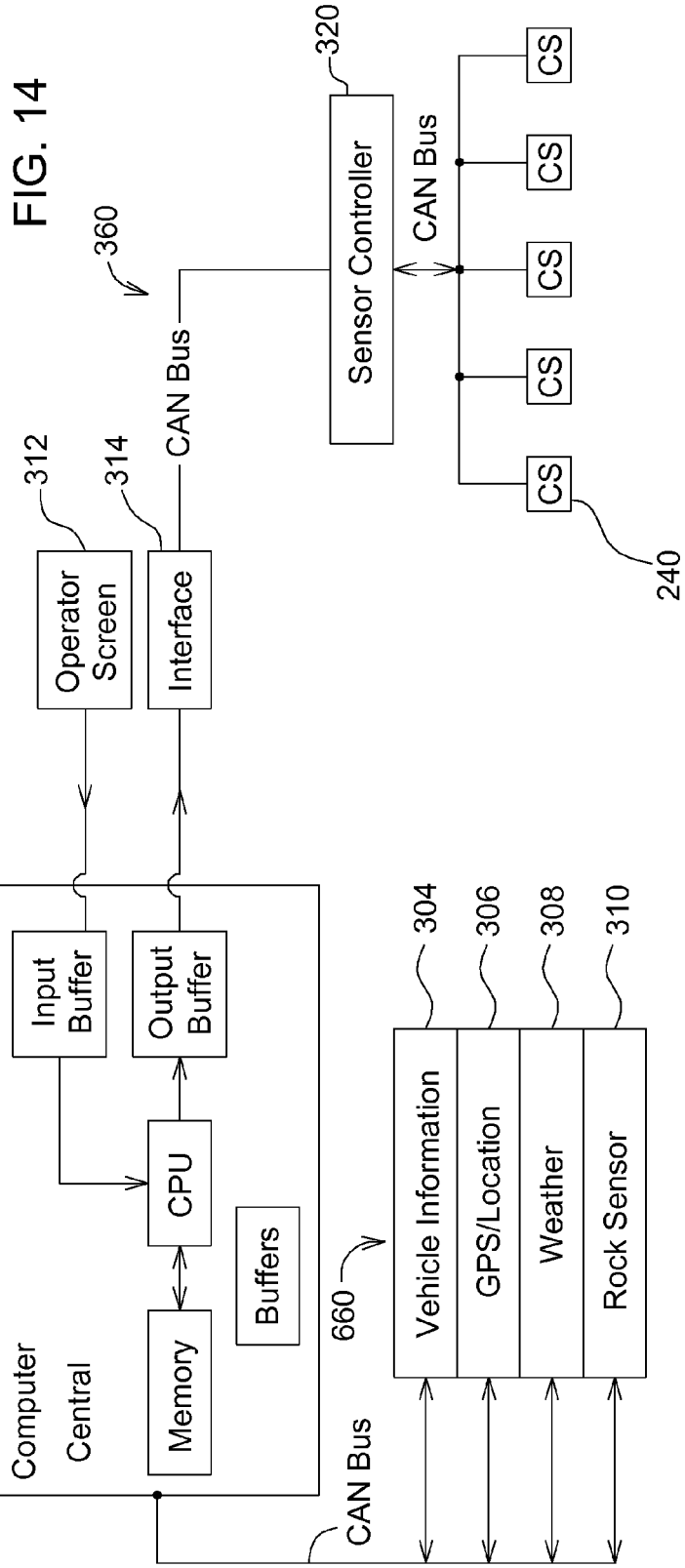
FIG. 14 depicts an example electronic system to coordinate the sensor information.

FIG. 14 depicts an example machine control 300 system of electronics that uses CAN-bus 360 as an example communication backbone to coordinate the activity of many types of signal inputs and interruptions that may occur. Machine control 300 includes an operator's central computer 302 or server situated at locations such as a farm site, a cab of a tractor, or in non-agricultural situations, on a construction or mining machine. Machine control 300 as well as any number of interrupters (e.g. central computer 302, operator's touchscreen 312 or remote starter, tillage sensor interface 314, vehicle information 304, GPS/locator 306, weather inputs 308, rock sensor 310) can interrupt the CAN-bus 360 and take control, including a master sensor controller 320. Usually there are more than one spring sensor 240 in operation so that the master sensor controller 320 is used to coordinate the activities of the different spring sensors 240 that are mounted to each spring (e.g. 100). The master sensor controller 320 includes a microprocessor plus peripherals or a microcontroller (e.g. CPU, memory, etc.) mounted to or within the hollow of the disk gang axis tube 218 electronics portal (not shown). The electronic wiring readily fits inside the tube 218. The master sensor controller 320 addresses each spring distance sensor 240 and performs the functions of an interface for each sensor 240 to the CAN bus, controls collective activity such as synchronization/ timing architecture 330 of disk and spring performance by simultaneously sending a master clock and poll commands to each spring distance sensor 240 to continuously monitor for spring failures. For instance in an agricultural application where the distance between legs 14 and 16 of the main C-spring 12 is nominally 300 mm apart, a constant deflection of 15 mm (or 5%) is often an indication of a major failure in the combination spring 100. By remaining deflected more than 15 mm over many clock cycles of the master clock generally indicates that the main C-spring 12 is stuck and unable to resiliently go back to its normal state. Such a signal condition is transmitted back along CAN-bus 360 to the operator or to the central computer 302 that can take corrective action, such as slowing or stopping the vehicle for inspection or flagging an alarm condition. If there are not many disks 220, it may also be possible to coordinate the signals wirelessly without interference rather than use wiring and CAN-bus. For instance, WIFI or 802.11 communication protocols are sufficiently fast to accommodate the multitude of signal traffic.

While each of the combination spring embodiments has different features, it is to be understood that various combinations of these features may be implemented in other overload spring designs without departing from the principles of the present embodiments. For example, although the figures depict two nested springs, additional springs can also be added to further fine tune the spring rate or other properties of springs. While the examples referred to agriculture, C-springs and thus combination springs can also be used in industrial equipment such as for shaker screens. Even amusement park rides sometimes use these to bounce something up and down such as to simulate earth shaking.

Finally, the orientation and directions stated and illustrated in this disclosure should not be taken as limiting. Many of the orientations stated in this disclosure and claims are with reference to the direction of travel of the equipment. But, the directions, e.g. "upper," "lower," "behind" can also are merely illustrative and do not orient the embodiments absolutely in space. That is, a structure manufactured on its "side" or "bottom" is merely an arbitrary orientation in space that has no absolute direction. Also, in actual usage, for example, the spring equipment may be operated or turned around positioned at an angle because the implements may move in many directions such as on a hill or be turned upside down; and then, "upper" is pointing to the "side" or "lower." Thus, the stated directions in this application may be arbitrary designations. Additionally, the values stated such as for the angles should also cover the possibility of measurement errors or manufacturing tolerances of about 1 to 2 degrees or depending on the manufacturing methods. For example, 40 degrees may include 39 degrees.

What is claimed is:

1. A spring system comprising:
   a disk bearing standard attached to an agricultural implement frame;
   the disk bearing standard having a combination spring;
   the combination spring having a C-shaped spring and an overload spring nested within the C-shaped spring;
   the C-shaped spring having an upper leg and a lower leg joined by a bight;
   the overload spring having a top leg and a bottom leg joined by a curved piece;
   the top leg and the bottom leg, each being a straight section; and
   wherein at least one of the upper leg and the top leg, and the lower leg and the bottom leg, are attached together; and
   wherein in a first condition, the overload spring is in contact with one of the upper and lower legs and is spaced apart from the other one of the upper and lower legs;
   wherein in a second condition, the overload spring is in contact with the upper leg at a first contact point and the lower leg at a second contact point, and at least a portion of the overload spring is spaced apart from the C-shaped spring between the first and second contacts points.

2. The spring system of claim 1, wherein the overload spring comprises a V-shape spring with the curved piece spanning an apex of the V-shaped spring.

3. The spring system of claim 1, wherein the top leg and the bottom leg form an angle of 40-80 degrees.

4. The spring system of claim 1, wherein an end of the top or the bottom leg is spaced from the lower and the upper leg, respectively, by at least 10% of a distance between the upper leg and the lower leg.

5. The spring system of claim 1, further comprising a hard stop protrusion extended vertically from either the top or the bottom legs towards a space between the upper and the lower legs.

6. The spring system of claim 1, further comprising a distance sensor mounted to an underside surface of the upper leg or an upperside surface of the lower leg, wherein the distance sensor is set up to measure a distance between legs of the combination spring.

7. The spring system of claim 1, wherein the agricultural frame is attached to a motor vehicle; and a rock sensor mounted to a front of the motor vehicle, wherein upon detection of rocks greater than a predetermined size, the motor vehicle slows, stops or alerts.

8. The spring system of claim 1, wherein the lower leg and the bottom leg are attached together.

9. The spring system of claim 1, wherein the upper leg and the top leg are attached together.

10. The spring system of claim 8, wherein an end of the top leg is joined to a slightly downwardly inclined straight end portion by a slightly curved portion having an upper curved surface.

11. The spring system of claim 9, wherein a rear end of the top leg is provided with at least one of a lip or ledge that engages a rear end surface of the upper leg.

12. The spring system of claim 1, wherein the overload spring is spaced apart from the bight of the C-shaped spring between the first and second contact points.

13. A spring system comprising:
a combination spring having a C-shaped spring and an overload spring nested within the C-shaped spring;
the C-shaped spring having an upper leg and a lower leg joined by a bight;
the overload spring having a top leg and a bottom leg joined by a curved piece;
the top leg and the bottom leg, each being a planar piece; and
wherein at least one of the upper leg and the top leg, and the lower leg and the bottom leg, are attached together; and
wherein in a first condition, the overload spring is in contact with one of the upper and lower legs and is spaced apart from the other one of the upper and lower legs;
wherein in a second condition, the overload spring is in contact with the upper leg at a first contact point and the lower leg at a second contact point, and at least a portion of the overload spring is spaced apart from the C-shaped spring between the first and second contacts points.

14. The spring system of claim 13, wherein the overload spring comprises a V-shape spring with the curved piece spanning an apex of the V-shaped spring.

15. The spring system of claim 13, further comprising a distance sensor mounted to an underside surface of one of the upper leg or an upperside surface of the lower leg, wherein the distance sensor is set up to measure a distance between legs of the combination spring.

16. The spring system of claim 13, wherein the overload spring is spaced apart from the bight of the C-shaped spring between the first and second contact points.

17. A spring system comprising:
a combination spring having a main C-shaped spring and an overload spring nested within the main C-shaped spring;
the main C-shaped spring having an upper leg and a lower leg joined by a bight;
the overload spring having a top leg and a bottom leg joined by a curved piece;
the upper leg and the top leg being tied together; and
the bottom leg includes a straight section forming a 40-55 degrees angle away from the top leg; and
wherein in a first condition, the overload spring is in contact with the upper leg and is spaced apart from the lower leg;
wherein in a second condition, the overload spring is in contact with the upper leg at a first contact point and the lower leg at a second contact point, and at least a portion of the overload spring is spaced apart from the C-shaped spring between the first and second contacts points.

18. The spring system of claim 17, wherein an end of the bottom leg is spaced from the lower leg, by at least 10% of a distance between the upper leg and the lower leg.

19. The spring system of claim 17, further comprising a bearing housing and spool attached to an underside surface of the lower leg; and a ground working disk mounted to an axle of the spool.

20. The spring system of claim 17, wherein the overload spring is spaced apart from the bight of the C-shaped spring between the first and second contact points.

21. The spring system of claim 17, wherein a rear end of the top leg is provided with at least one of a lip or ledge that engages a rear end surface of the upper leg.

* * * * *